(12) United States Patent
Phillips et al.

(10) Patent No.: US 7,815,541 B2
(45) Date of Patent: Oct. 19, 2010

(54) MULTI-SPEED TRANSMISSION

(75) Inventors: Andrew W. Phillips, Saline, MI (US);
Scott H. Wittkopp, Ypsilanti, MI (US);
James M. Hart, Belleville, MI (US);
Clinton E. Carey, Monroe, MI (US);
Madhusudan Raghavan, West
Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 438 days.

(21) Appl. No.: 11/832,438

(22) Filed: Aug. 1, 2007

(65) Prior Publication Data

US 2009/0036255 A1   Feb. 5, 2009

(51) Int. Cl.
*F16H 3/62* (2006.01)

(52) U.S. Cl. ...................................... 475/275
(58) Field of Classification Search ......... 475/275–278, 475/284
See application file for complete search history.

(56) References Cited

U.S. PATENT DOCUMENTS

| | | | |
|---|---|---|---|
| 4,070,927 A * | 1/1978 | Polak | 475/286 |
| 4,683,776 A * | 8/1987 | Klemen | 475/286 |
| 6,176,803 B1 * | 1/2001 | Meyer et al. | 475/286 |
| 6,342,026 B1 | 1/2002 | Takagi | |
| 6,547,688 B2 | 4/2003 | Takagi | |
| 6,736,751 B1 | 5/2004 | Usoro | |
| 6,743,139 B1 | 6/2004 | Usoro | |
| 6,743,140 B1 | 6/2004 | Lee | |
| 6,743,142 B1 | 6/2004 | Lee | |
| 6,743,143 B1 | 6/2004 | Usoro | |
| 6,743,144 B1 | 6/2004 | Lee | |
| 6,746,357 B1 | 6/2004 | Usoro | |
| 6,752,736 B1 | 6/2004 | Lee | |
| 6,755,765 B2 | 6/2004 | Usoro | |
| 6,758,784 B2 | 7/2004 | Lee | |
| 6,758,787 B2 | 7/2004 | Usoro | |
| 6,764,424 B1 | 7/2004 | Usoro | |
| 6,764,425 B2 | 7/2004 | Lee | |
| 6,764,426 B2 | 7/2004 | Lee | |
| 6,767,307 B1 | 7/2004 | Lee | |
| 6,811,512 B2 | 11/2004 | Usoro | |
| 6,837,823 B2 | 1/2005 | Lee | |
| 6,852,059 B2 | 2/2005 | Lee | |
| 6,960,149 B2 | 11/2005 | Ziemer | |
| 7,011,597 B2 | 3/2006 | Haka | |
| 7,014,589 B2 | 3/2006 | Stevenson | |
| 7,128,683 B2 | 10/2006 | Oguri | |
| 7,163,484 B2 | 1/2007 | Klemen | |
| 7,226,381 B2 * | 6/2007 | Klemen | 475/275 |
| 7,364,527 B2 * | 4/2008 | Klemen | 475/290 |

(Continued)

*Primary Examiner*—Ha D. Ho

(57) ABSTRACT

A transmission is provided having an input member, an output member, four planetary gear sets, a plurality of interconnecting members and a plurality of torque transmitting devices. Each of the planetary gear sets includes first, second and third members. A first interconnecting member continuously interconnects the third member of the first planetary gear set with the third member of the third planetary gear set. A second interconnecting member continuously interconnects the second member of the first planetary gear set with the third member of the second planetary gear set. A third interconnecting member continuously interconnects the first member of the second planetary gear set with the first member of the third planetary gear set. A fourth interconnecting member continuously interconnects the second member of the third planetary gear set with a third member of the fourth planetary gear set. The torque transmitting devices may include clutches and brakes.

13 Claims, 2 Drawing Sheets

U.S. PATENT DOCUMENTS

| | | |
|---|---|---|
| 2004/0048716 A1* | 3/2004 | Ziemer ........................ 475/286 |
| 2006/0019791 A1 | 1/2006 | Baldwin |
| 2006/0270514 A1 | 11/2006 | Oguri |
| 2006/0270516 A1 | 11/2006 | Klemen |
| 2009/0017966 A1* | 1/2009 | Phillips et al. .............. 475/275 |

* cited by examiner

| GEAR STATE | Gear Ratio | Ratio Step | TORQUE TRANSMITTING ELEMENTS ||||| 
|---|---|---|---|---|---|---|---|
| | | | 34 | 32 | 28 | 26 | 30 |
| Rev | -3.700 | | X | | | X | X |
| N | | -0.68 | O | | | O | |
| 1st | 5.411 | | X | | X | X | |
| 2nd | 3.808 | 1.42 | X | X | | X | |
| 3rd | 2.900 | 1.31 | X | X | X | | |
| 4th | 2.329 | 1.25 | X | X | | | X |
| 5th | 1.728 | 1.35 | X | | X | | X |
| 6th | 1.246 | 1.39 | | X | X | | X |
| 7th | 1.000 | 1.25 | | | X | X | X |
| 8th | 0.773 | 1.29 | | X | | X | X |

X = ON, CARRYING TORQUE
O = ON, NOT CARRYING TORQUE

*Figure 3*

MULTI-SPEED TRANSMISSION

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes four planetary gear sets, three clutches, and two brakes.

It is thus an object of the present invention to provide a transmission having four planetary gear sets.

It is a further object of the present invention to provide a transmission having at least eight forward speeds and at least one reverse.

It is a still further object of the present invention to provide a transmission having four planetary gear sets, a plurality of coupling members and a plurality of torque transmitting devices.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting clutches in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. A first component or element of a first planetary gear set is permanently coupled to a first component or element of a second planetary gear set. A second component or element of the first planetary gear set is permanently coupled to a second component or element of a third planetary gear set. A first component or element of the third planetary gear set is permanently coupled to a first component or element of a fourth planetary gear set. Finally, a third component or element of the third planetary gear set is permanently coupled to a third component or element of the second planetary gear set.

Figure 1:
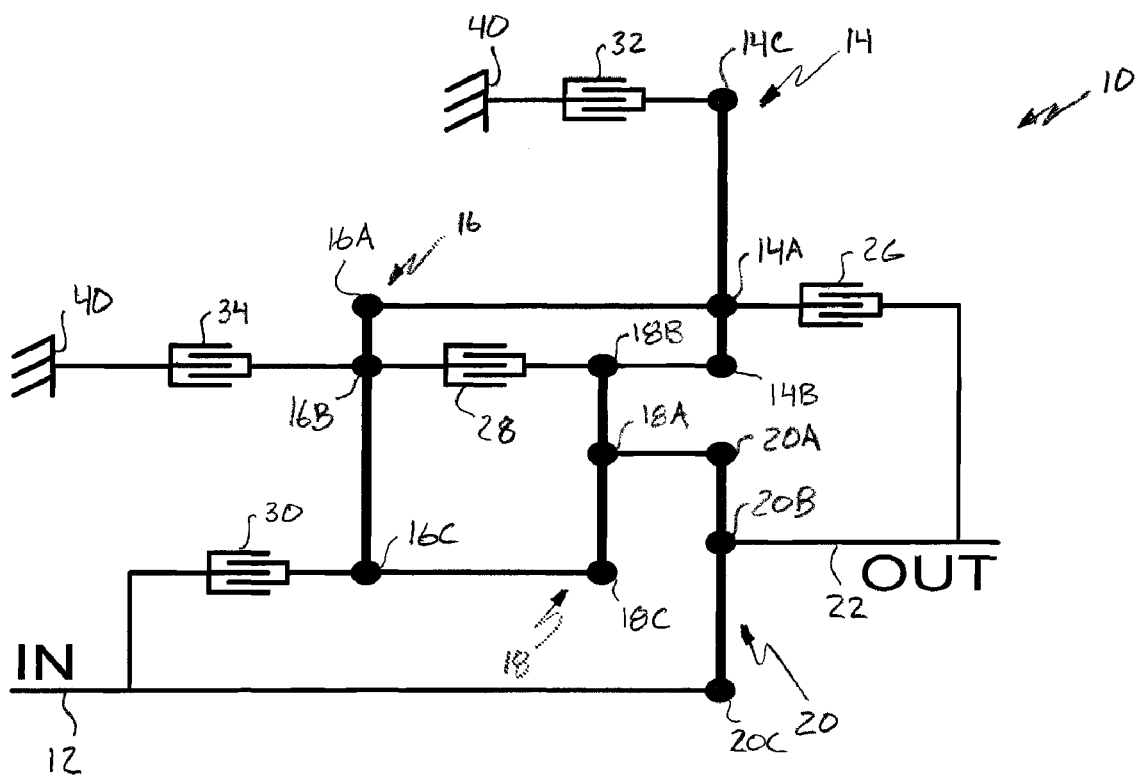
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the third node 20C of the fourth planetary gear set 20. The output member 22 is coupled to the second node 20B of the fourth planetary gear set 20. The first node 14A of the first planetary gear set 14 is coupled to the first node 16A of the second planetary gear set 16. The second node 14B of the first planetary gear set 14 is coupled to the second node 18B of the third planetary gear set 18. The first node 18A of the third planetary gear set 18 is coupled to the first node 20A of the fourth planetary gear set 20. The third node 18C of the third planetary gear set 18 is coupled to the third node 16C of the second planetary gear set 16.

A first clutch 26 selectively connects the first node 14A of the first planetary gear set 14 to the output member 22. A second clutch 28 selectively connects the second node 16B of the second planetary gear set 16 to the second node 18B of the third planetary gear set 18. A third clutch 30 selectively connects the input member 12 to the third node 16C of the second planetary gear set 16. A first brake 32 selectively connects the third node 14C of the first planetary gear set 14 to a ground or transmission housing 40. A second brake 34 selectively connects the second node 16B of the second planetary gear set 16 to the ground or transmission housing 40.

Figure 2:
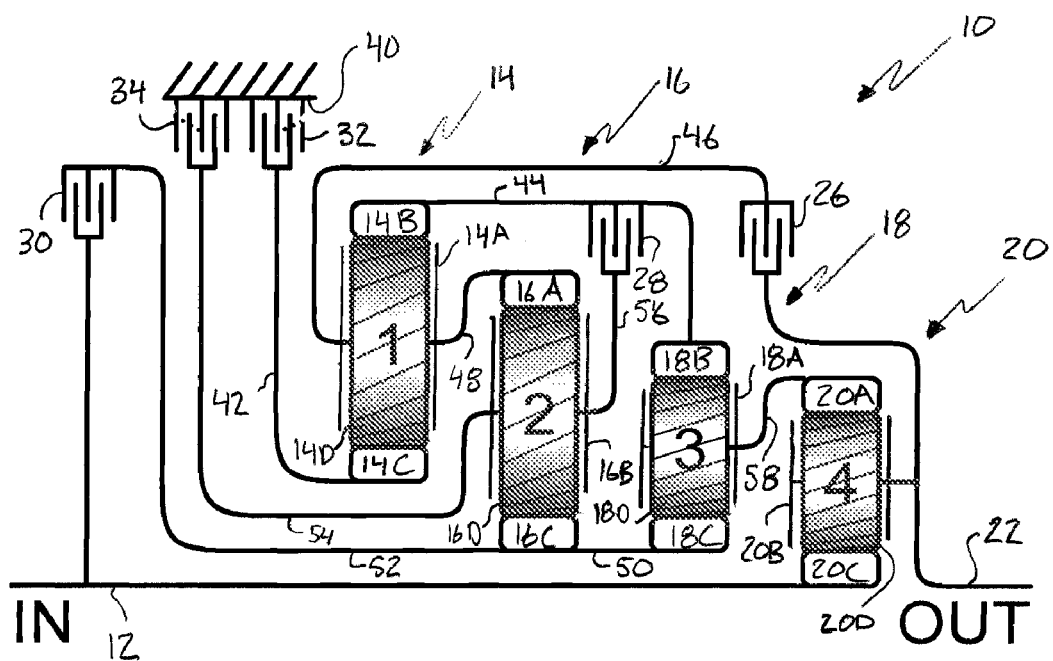
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 is a planetary gear set that includes a sun gear member 14C, a planet gear carrier member 14A and a ring gear member 14B. The sun gear member 14C is connected for common rotation with a first shaft or intermediate member 42. The ring gear member 14B is connected to a second shaft or intermediate member 44. The planet gear carrier member 14A rotatably supports a set of planet gears 14D (only one of which is shown) and is connected for common rotation with a third shaft or intermediate member 46 and with a fourth shaft or intermediate member 48. The planet gears 14D are configured to intermesh with both the sun gear member 14C and the ring gear member 14B.

The input shaft or member 12 is continuously connected to an engine (not shown) or to a turbine of a torque converter (not shown). The output shaft or member 22 is continuously connected with the final drive unit or transfer case (not shown).

The planetary gear set 16 is a planetary gear set that includes a sun gear member 16C, a planet carrier member 16B that rotatably supports a set of planet gears 16D and a ring gear member 16A. The sun gear member 16C is connected for common rotation with a fifth shaft or intermediate member 50 and with a sixth shaft or intermediate member 52. The planet carrier member 16B is connected for common rotation with a seventh shaft or intermediate member 54 and with an eighth shaft or intermediate member 56. The ring gear member 16A is connected for common rotation with the fourth intermediate member 48. The planet gears 16D are configured to intermesh with both the sun gear member 16C and the ring gear member 16A.

The planetary gear set 18 is a planetary gear set that includes a sun gear member 18C, a ring gear member 18B and a planet carrier member 18A that rotatably supports a set of planet gears 18D. The sun gear member 18C is connected for common rotation with the fifth intermediate member 50. The ring gear member 18B is connected for common rotation with the second intermediate member 44. The planet carrier member 18A is connected for common rotation with a ninth shaft or intermediate member 58. The planet gears 18D are configured to intermesh with both the sun gear member 18C and the ring gear member 18B.

The planetary gear set 20 is a planetary gear set that includes a sun gear member 20C, a ring gear member 20A and a planet carrier member 20B that rotatably supports a set of planet gears 20D. The sun gear member 20C is connected for common rotation with the input member 12. The ring gear member 20A is connected for common rotation with the ninth intermediate member 58. The planet carrier member 20B is connected for common rotation with the output member 22. The planet gears 20D are configured to intermesh with both the sun gear member 20C and the ring gear member 20A.

The torque-transmitting mechanisms or clutches 26, 28, 30, and brakes 32, 34 allow for selective interconnection of the shafts or interconnecting members, members of the planetary gear sets and the housing. For example, the first clutch 26 is selectively engageable to connect the third intermediate member 46 with the output member 22. The second clutch 28 is selectively engageable to connect the second intermediate member 44 with the eighth intermediate member 56. The third clutch 30 is selectively engageable to connect the input member 12 with the sixth intermediate member 52. The first brake 32 is selectively engageable to connect the first intermediate member 42 to the ground or transmission housing 40 in order to restrict the sun gear member 14C from rotating relative to the ground or transmission housing 40. The second brake 34 is selectively engageable to connect the seventh intermediate member 54 to the ground or transmission housing 40 in order to restrict the planet carrier member 16B from rotating relative to the ground or transmission housing 40.

Referring now to FIGS. 2 and 3, the operation of the embodiment of the eight speed transmission 10 will be described. It will be appreciated that the transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32, and second brake 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first clutch 26, the third clutch 30, and the second brake 34 are engaged or activated. The first clutch 26 connects the third intermediate member 46 with the output member 22. The third clutch 30 connects the input member 12 with the sixth intermediate member 52. The second brake 34 connects the seventh intermediate member 54 to the ground or transmission housing 40 in order to restrict the planet carrier member 16B from rotating relative to the ground or transmission housing 40. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The transmission 10 of the present invention provides several advantages and benefits over the prior art. More specifically, the transmission 10 provides improved packaging, gain mismatches, and spin loss. Additionally, tall gear sets are able to be located at a front of the transmission 10 and four of the five torque transmitting devices may also be located at the front of the transmission.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members;
a first interconnecting member continuously interconnecting the third member of the first planetary gear set with the third member of the third planetary gear set;
a second interconnecting member continuously interconnecting the second member of the first planetary gear set with the third member of the second planetary gear set;
a third interconnecting member continuously interconnecting the first member of the second planetary gear set with the first member of the third planetary gear set;
a fourth interconnecting member continuously interconnecting the second member of the third planetary gear set with a third member of the fourth planetary gear set; and
five torque-transmitting mechanisms each selectively engageable to interconnect at least one of the first, second, and third members with at least another of the first, second, and third members and a stationary member; and
wherein the torque-transmitting mechanisms are selectively engageable in combinations of at least three to establish at least eight forward speed ratios and at least one reverse speed ratio between the input member and the output member.

2. The transmission of claim 1 wherein a first of the five torque transmitting mechanisms is selectively engageable to interconnect the second member of the second planetary gear set with the stationary member.

3. The transmission of claim 2 wherein a second of the five torque transmitting mechanisms is selectively engageable to interconnect the first member of the first planetary gear set with the stationary member.

4. The transmission of claim 3 wherein a third of the five torque transmitting mechanisms is selectively engageable to interconnect the input member with the first member of the second planetary gear set.

5. The transmission of claim 4 wherein a fourth of the five torque transmitting mechanisms is selectively engageable to interconnect the second member of the second planetary gear set with the third member of the third planetary gear set.

6. The transmission of claim 5 wherein a fifth of the five torque transmitting mechanisms is selectively engageable to interconnect the second member of the first planetary gear set with the output member.

7. The transmission of claim 1 wherein the first and second torque transmitting mechanisms are brakes and wherein the third, fourth, and fifth torque transmitting mechanisms are clutches.

8. The transmission of claim 1 wherein the first members are sun gears, the second members are carrier members, and the third members are ring gears.

9. The transmission of claim 5 wherein the input member is continuously interconnected with the first member of the fourth planetary gear set and the output member is continuously interconnected with the second member of the fourth planetary gear set.

10. A transmission comprising:
an input member;
an output member;
first, second, third and fourth planetary gear sets each having first, second and third members, wherein the input member is continuously interconnected with the first member of the fourth planetary gear set, and the output member is continuously interconnected with the second member of the fourth planetary gear set;
a first interconnecting member continuously interconnecting the third member of the first planetary gear set with the third member of the third planetary gear set;
a second interconnecting member continuously interconnecting the second member of the first planetary gear set with the third member of the second planetary gear set;
a third interconnecting member continuously interconnecting the first member of the second planetary gear set with the first member of the third planetary gear set;
a fourth interconnecting member continuously interconnecting the second member of the third planetary gear set with a third member of the fourth planetary gear set;
a first torque-transmitting mechanism selectively engageable to interconnect the second member of the second planetary gear set with a stationary member;
a second torque-transmitting mechanism selectively engageable to interconnect the first member of the first planetary gear set with the stationary member;
a third torque-transmitting mechanism selectively engageable to interconnect the input member with the first member of the second planetary gear set;
a fourth torque-transmitting mechanism selectively engageable to interconnect the second member of the second planetary gear set with the third member of the third planetary gear set;
a fifth torque-transmitting mechanism selectively engageable to interconnect the second member of the first planetary gear set with the output member; and
wherein the torque-transmitting mechanisms are selectively engageable in combinations of at least three to establish at least eight forward speed ratios and at least one reverse speed ratio between the input member and the output member.

11. The transmission of claim 10 wherein the first and second torque transmitting mechanisms are brakes and wherein the third, fourth, and fifth torque transmitting mechanisms are clutches.

12. The transmission of claim 10 wherein the first members are sun gears, the second members are carrier members, and the third members are ring gears.

13. A transmission comprising:
an input member;
an output member;
first, second, third and fourth planetary gear sets each having a sun gear, a carrier member, and a ring gear, wherein the input member is continuously interconnected with the sun gear of the fourth planetary gear set, and the output member is continuously interconnected with the carrier member of the fourth planetary gear set;
a first interconnecting member continuously interconnecting the ring gear of the first planetary gear set with the ring gear of the third planetary gear set;
a second interconnecting member continuously interconnecting the carrier member of the first planetary gear set with the ring gear of the second planetary gear set;

a third interconnecting member continuously interconnecting the sun gear of the second planetary gear set with the sun gear of the third planetary gear set;

a fourth interconnecting member continuously interconnecting the carrier member of the third planetary gear set with ring gear of the fourth planetary gear set;

a first torque-transmitting mechanism selectively engageable to interconnect the carrier member of the second planetary gear set with a stationary member;

a second torque-transmitting mechanism selectively engageable to interconnect the sun gear of the first planetary gear set with the stationary member;

a third torque-transmitting mechanism selectively engageable to interconnect the input member with the sun gear of the second planetary gear set;

a fourth torque-transmitting mechanism selectively engageable to interconnect the carrier member of the second planetary gear set with the ring gear of the third planetary gear set;

a fifth torque-transmitting mechanism selectively engageable to interconnect the carrier member of the first planetary gear set with the output member; and wherein the torque-transmitting mechanisms are selectively engageable in combinations of at least three to establish at least eight forward speed ratios and at least one reverse speed ratio between the input member and the output member.

* * * * *